United States Patent
Jeong et al.

(10) Patent No.: US 9,990,725 B2
(45) Date of Patent: Jun. 5, 2018

(54) MEDICAL IMAGE PROCESSING APPARATUS AND MEDICAL IMAGE REGISTRATION METHOD USING VIRTUAL REFERENCE POINT FOR REGISTERING IMAGES

(71) Applicant: SAMSUNG ELECTRONICS CO., LTD., Suwon-si (KR)

(72) Inventors: Jayeon Jeong, Yongin-si (KR); Won-chul Bang, Seongnam-si (KR); Jiwon Ryu, Suwon-si (KR); Youngtaek Oh, Seoul (KR); Jungwoo Chang, Seoul (KR); Jungbae Kim, Seoul (KR); Kyong Joon Lee, Seongnam-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 109 days.

(21) Appl. No.: 14/823,059

(22) Filed: Aug. 11, 2015

(65) Prior Publication Data
US 2016/0155222 A1 Jun. 2, 2016

(30) Foreign Application Priority Data
Nov. 28, 2014 (KR) .................. 10-2014-0168051

(51) Int. Cl.
| G06K 9/00 | (2006.01) |
| G06T 7/00 | (2017.01) |
| G06T 7/33 | (2017.01) |
| G06T 7/11 | (2017.01) |
| G06T 7/194 | (2017.01) |

(52) U.S. Cl.
CPC ............. *G06T 7/003* (2013.01); *G06T 7/11* (2017.01); *G06T 7/194* (2017.01); *G06T 7/337* (2017.01); *G06T 2207/10081* (2013.01); *G06T 2207/10132* (2013.01)

(58) Field of Classification Search
None
See application file for complete search history.

(56) References Cited

U.S. PATENT DOCUMENTS

| 2010/0099981 A1* | 4/2010 | Fishel | A61B 90/36 600/424 |
| 2015/0209015 A1* | 7/2015 | Oh | A61B 8/5261 600/440 |
| 2016/0155222 A1* | 6/2016 | Jeong | G06T 7/003 382/131 |

* cited by examiner

*Primary Examiner* — Tahmina Ansari
(74) *Attorney, Agent, or Firm* — Sughrue Mion, PLLC

(57) ABSTRACT

A medical image registration method includes determining whether a reference point of registration is present in a first medical image and a second medical image of an object; in response to determining that the reference point is not present in one of the first medical image and the second medical image, estimating a virtual reference point corresponding to the reference point in one of the first medical image and the second medical image, in which the reference point is not present, by using anatomical information of the object; and registering the first medical image and the second medical image by using the estimated virtual reference point.

21 Claims, 13 Drawing Sheets

MEDICAL IMAGE PROCESSING APPARATUS AND MEDICAL IMAGE REGISTRATION METHOD USING VIRTUAL REFERENCE POINT FOR REGISTERING IMAGES

CROSS-REFERENCE TO RELATED APPLICATION

This application claims priority from Korean Patent Application No. 10-2014-0168051, filed on Nov. 28, 2014, in the Korean Intellectual Property Office, the disclosure of which is incorporated herein by reference in its entirety.

BACKGROUND

1. Field

Apparatuses and methods consistent with exemplary embodiments relate to a medical image processing apparatus and a medical image registration method using the same.

2. Description of the Related Art

Recently, the minimalized medical procedures have been developed requiring delicate manipulations of a medical apparatus inserted into a passage of a human body, while visually observing the medical procedure on a medical imaging apparatus without having to perform an extensive surgical incision to expose a portion of the body for direct surgery and observation.

In minimalized medical procedures, a surgeon needs to accurately comprehend the position of a surgical site, for example, a lesion, through images, and also needs to comprehend the changes due to breathing or moving of a patient while performing a surgical procedure. Therefore, the surgeon needs to perform the surgical procedure by promptly determining the object motion based on real-time images, for example, by observing the ultrasonic images. However, determining the shapes of the organs and/or the lesions in the real-time ultrasonic images may be difficult.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

One or more exemplary embodiments provide a medical image processing apparatus and a medical image registration method configured to register medical images by estimating virtual reference points on the medical images provided with no registration reference points shown thereto from a plurality of medical images to be registered.

In accordance with an aspect of an exemplary embodiment, a medical image registration method includes determining whether a reference point of registration is present on each of a first medical image and a second medical image; estimating a virtual reference point corresponding to the reference point on a medical image at which the reference point is not present, by use of anatomical information of an object; and registering the first medical image and the second medical image by use of the estimated virtual reference point.

The estimating of the virtual reference point may include: in a case when a reference point of registration is not present on each of first medical image and the second medical image, determining a peripheral tissue related to the reference point on each of the first image and the second image; and estimating the virtual reference point corresponding to the reference point from the peripheral tissue on each of the first medical image and the second medical image based on an anatomical structure between the determined peripheral tissue and the reference point.

The estimating of the virtual reference point may include: in a case when a reference point of registration is not present on each of the first medical image and the second medical image, determining a peripheral tissue related to the reference point on each of the first image and the second image; and estimating the virtual reference point on each of the first medical image and the second medical image by use of pre-learned shape information related to the peripheral tissue or by use of geometric information between the peripheral tissue and the reference point.

The registering of the first image and the second image may include registering the first medical image and the second medical image by use of the estimated virtual reference points on the first medical image and the second medical image.

The estimating of the virtual reference point may include: in a case when a reference point is present only on the first medical image between the first medical image and the second medical image, determining a peripheral tissue related to the reference point on the second medical image at which the reference point is not present; and estimating the virtual reference point corresponding to the reference point from the peripheral tissue based on the anatomical structure between the determined peripheral tissue and the reference point.

The estimating of the virtual reference point may include: in a case when a reference point is present only on the first medical image between the first medical image and the second medical image, determining the peripheral tissue related to the reference point on the second medical image not having the reference point; and estimating the virtual reference point by use of pre-learned shape information related to the determined peripheral tissue or by use of geometric information between the peripheral tissue and the reference point.

The registering of the first image and the second image may include registering the first medical image and the second medical image by use of the reference point of the first medical image and the estimated virtual reference point of the second medical image.

In accordance with an aspect of an exemplary embodiment, a medical image processing apparatus includes a communicator to receive a first medical image and a second medical image with respect to an object from a first medical imaging apparatus and a second medical imaging apparatus; and an image processor to estimate a virtual reference point corresponding to a reference point by use of anatomical information of an object from one of the first medical image and the second medical image not having shown with the reference point of registration.

The image processor, when a reference point is present only on the first medical image, may estimate the virtual reference point corresponding to the reference point on the second medical image by use of anatomical information of an object; and register the first medical image and the second medical image by use of the reference point of the first medical image and the virtual reference point of the second medical image.

The image processor may decide a peripheral tissue related to the reference point on the second medical image; and estimate the virtual reference point corresponding to the reference point from the peripheral tissue based on an anatomical structure between the decided peripheral tissue and the reference point.

The image processor may decide a geometric structure between the peripheral tissue and the reference point based on the anatomical relationship between the decided peripheral tissue and the reference point; and estimates the virtual reference point corresponding to the reference point by use of the decided geometric structure.

The image processor may estimate the virtual reference point corresponding to the reference point by use of pre-learned shape information with respect to the peripheral tissue or by use of geometric information between the peripheral tissue and the reference point.

If a reference point is not present at each of the first medical image and the second medical image, the image processor may estimate a virtual reference point corresponding to the reference point from each of the first medical image and the second medical image by use of anatomical information of the object; and register the first medical image and the second medical image by use of each estimated virtual reference point.

The image processor may decide a peripheral tissue related to the reference point from each of the first medical image and the second medical image; and estimate a virtual reference point of each of the first medical image and the second medical image corresponding to the reference point from the peripheral tissue based on an anatomical relationship between the decided peripheral tissue and the reference point.

The image processor may decide a geometric structure between the peripheral tissue and the reference point based on the anatomical relationship between the decided peripheral tissue and the reference point; and estimate a virtual reference point of each of the first medical image and the second medical image corresponding to the reference point by use of the decided geometric structure.

The image processor may estimate a virtual reference point of each of the first medical image and the second medical image corresponding to the reference point by use of pre-learned shape information with respect to the decided peripheral tissue or by use of geometric information between the peripheral tissue and the reference point.

The medical image processing apparatus may further include a display to display the first medical image and the second medical image that are registered.

In accordance with an aspect of an exemplary embodiment, a medical image registration method includes determining a reference point on a first medical image; estimating a virtual reference point corresponding to the reference point on a second medical image at which the reference point is not present by use of anatomical information of an object; and registering the first medical image and the second medical image by use of the reference point and the virtual reference point.

The estimating of the virtual reference point may include deciding a peripheral tissue related to the reference point; and estimating the virtual reference point corresponding to the reference point from the peripheral tissue based on an anatomical structure between the decided peripheral tissue and the reference point.

The estimating of the virtual reference point corresponding to the reference point from the peripheral point may include: deciding a geometric structure between the peripheral tissue and the reference point based on an anatomical relationship between the decided peripheral tissue and the reference point; and estimating the virtual reference point corresponding to the reference point by use of the decided geometric structure.

The estimating of the virtual reference point corresponding to the reference point from the peripheral point may include estimating the virtual reference point by use of pre-learned shape information with respect to the peripheral tissue or by use of geometric information between the peripheral tissue and the reference point.

BRIEF DESCRIPTION OF THE DRAWINGS

The above and/or other aspects will become more apparent by describing certain exemplary embodiments with reference to the accompanying drawings, in which.

DETAILED DESCRIPTION

Figure 1:
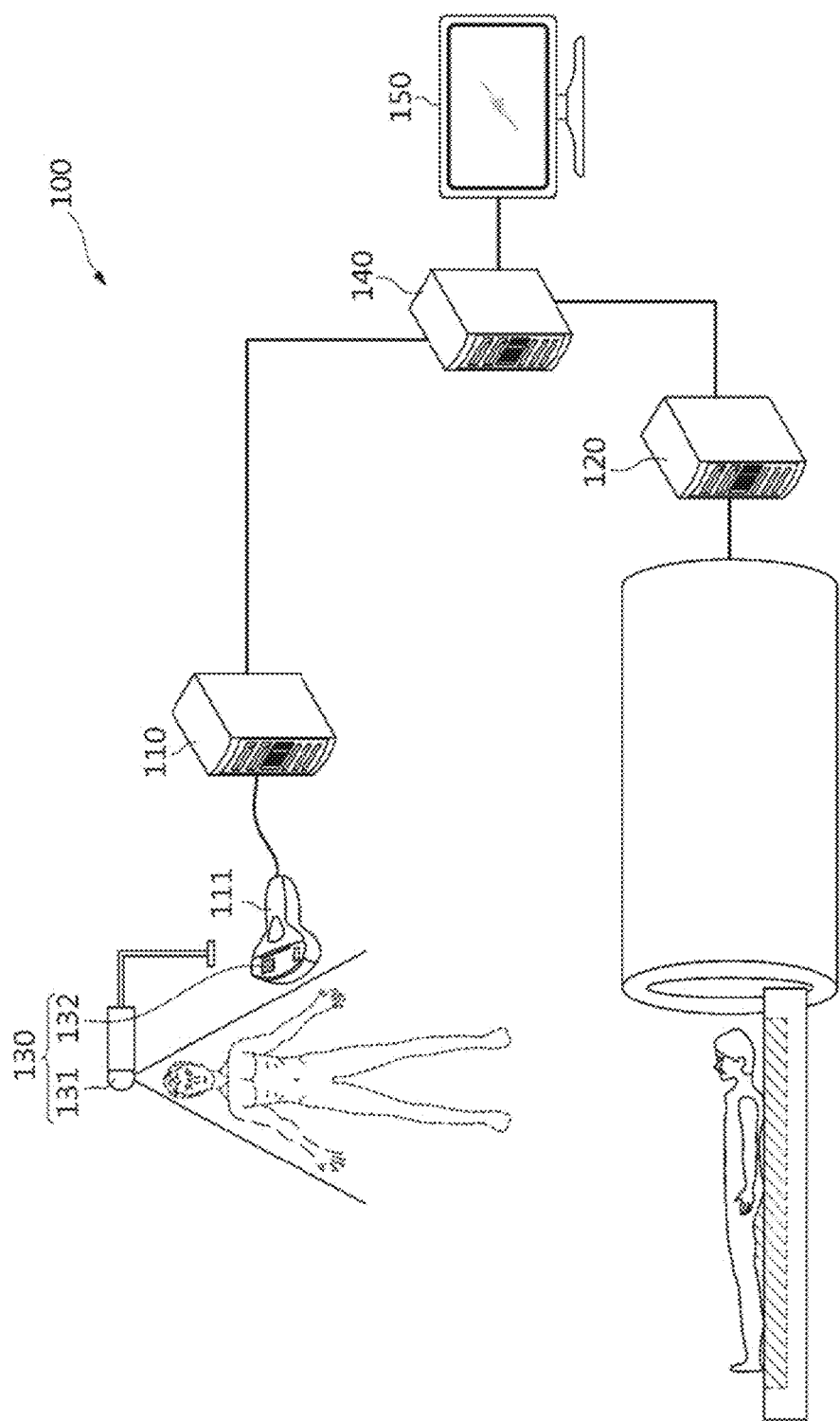
FIG. 1 illustrates a medical image processing system in accordance with an exemplary embodiment.

Certain exemplary embodiments are described in greater detail below with reference to the accompanying drawings.

In the following description, the same drawing reference numerals are used for the same elements even in different drawings. Thus, description of the same elements is not repeated. The matters defined in the description, such as detailed construction and elements, are provided to assist in a comprehensive understanding of exemplary embodiments. Thus, it is apparent that exemplary embodiments can be carried out without those specifically defined matters. Also, well-known functions or constructions are not described in detail since they would obscure exemplary embodiments with unnecessary detail.

FIG. 1 is a drawing illustrating a medical image processing system in accordance with an exemplary embodiment.

Referring to FIG. 1, an image processing system 100 includes a first medical apparatus 110, a second medical apparatus 120, a detection apparatus 130, a medical image processing apparatus 140, and a display 150.

In accordance with an exemplary embodiment, the first medical apparatus may be an apparatus configured to generate images during an interventional procedure of a medical surgery with respect to a patient. The first medical apparatus may include one of an ultrasonic imaging apparatus, an optical coherence tomography (OCT) imaging apparatus, a computed tomography (CT) imaging apparatus, a magnetic resonance (MR) imaging apparatus, an X-ray imaging apparatus, a single photon emission computed tomography (SPECT) imaging apparatus, and a positron emission tomography (PET) imaging apparatus. For example, an X-ray imaging apparatus may include a C-arm imaging apparatus.

The second medical apparatus may include one of an OCT imaging apparatus, a CT imaging apparatus, an MR imaging apparatus, an X-ray imaging apparatus, a SPECT imaging apparatus, and a PET imaging apparatus. For example, an X-ray imaging apparatus may include a C-arm imaging apparatus. The first medical apparatus and the second apparatus in accordance with an exemplary embodiment may be different medical apparatuses with respect to each other. For example, the first medical apparatus may be an ultrasonic imaging apparatus, and the second medical apparatus may be a CT imaging apparatus. Hereinafter, the ultrasonic imaging apparatus will be described as one example of the first medical apparatus and the CT imaging apparatus will be described as one example of the second medical apparatus.

The ultrasonic imaging apparatus is configured to emit ultrasonic waves to an object by use of an ultrasonic probe 111, and generate ultrasonic images by extracting the reflected ultrasonic waves. The ultrasonic probe includes a transducer to generate ultrasonic waves. The transducer may be provided in the form of a one-dimensional (1D) array or a two-dimensional (2D) array.

The transducer array is configured to generate ultrasonic waves while vibrated by use of pulse signals or alternating current applied to the transducer array. The generated ultrasonic wave is transmitted to a target portion at an inside an object. The ultrasonic waves generated at the transducer array are reflected at the target portion at the inside the object and then returned again to the transducer. The transducer array may receive echo ultrasonic waves that are reflected at the target portion and then returned. When the echo ultrasonic waves arrive at the transducer array, the transducer array is vibrated at a predetermined frequency corresponding to the frequency of the echo ultrasonic waves, and outputs the alternating current of the frequency that corresponds to the vibration frequency of the echo ultrasonic waves. The transducer array may convert the received alternating current into predetermined electrical signals. The elements structuring the transducer array may include a piezo-electric resonator or a thin film. The piezo-electric resonator or the thin film, when the alternating current is applied from a power, is vibrated at a predetermined frequency according to the applied alternating current, and according to the vibration frequency, the ultrasonic waves of the predetermined frequency are generated. In the contrary, the piezo-electric resonator or the thin film, when the ultrasonic waves of the predetermined frequency arrive at the piezo-electric resonator or the thin film, is vibrated according to the echo frequency, and outputs the alternating current of the frequency corresponding to the vibration frequency. An ultrasonic transducer may include one of a magnetostrictive ultrasonic transducer provided to use magnetostrictive effects of magnetic material, a piezoelectric ultrasonic transducer provided to use piezoelectric effects of piezoelectric material, and a capacitive micromachined ultrasonic transducer (cMUT) provided to send/receive ultrasonic waves by use of vibrations of hundreds or thousands of micro-processed thin films. In addition, other than the above, other types of transducers capable of generating ultrasonic waves according to electrical signals or capable of generating electrical signals according to ultrasonic waves may be referred to as examples of the ultrasonic transducers.

The ultrasonic imaging apparatus is configured to generate ultrasonic image signals with respect to a target portion at an inside an object by focusing the ultrasonic waves generated from the transducer array. The ultrasonic imaging apparatus is configured to convert the generated ultrasonic image signals into ultrasonic image information according to a diagnostic mode such as a B-mode or a Doppler mode, and convert the converted ultrasonic image information into general video signals to be shown at the display. The ultrasonic imaging apparatus may perform volume rendering based on the video signals as to display three-dimensional (3D) images, and after generating final result images by calibrating the rendered image information, the generated result images may be sent to the display of the ultrasonic imaging apparatus. The ultrasonic imaging apparatus may provide a first medical image in real time with respect to the volume of interest (VOI) of the object, for example, when the deformations or displacements of organs according to bodily activities of the object occurred, so that the changes may be shown in an image in real time. However, the organs or lesions shown on the first medical image might not be clear, and accordingly, the deformations or displacements of the organs may be difficult to comprehend by use of only the first medical image.

The second medical apparatus may generate a second medical image with respect to the VOI of the object, and the second medical image may be pre-imaged and stored prior to a surgery. In a case of the CT or MR image generated by the second medical apparatus, the positions of the organs or lesions are clearly distinguished. However, the organs of a patient may be deformed or the positions of the organs may be changed when the patient breathes or moves during a surgery, and the CT image or the MR image does not reflect the deformations and displacements of the organs according to the movements of the patient in real time.

As described above, the ultrasonic image may be obtained in real time. However, when compared to the CT image or the MR image, the organs and the lesions might not be as clearly shown, and while the CT image or the MR image may clearly show the organs and the lesions, the CT image and the MR image might not be obtained in real time during a surgery, and thus the breathing and the movements of a patient that occur during the medical surgery would not be reflected in the CT or MR image. Therefore, in an exemplary embodiment, a method of registering the images, which are obtained from different modalities as to reflect superior characteristics of each image, is used. Furthermore, in an exemplary embodiment, in a case when a reference point of registration is not shown on an image subject to the registration, a method of registering by estimating a virtual reference point of the registration is provided. Hereinafter, the method of registration of medical images in accordance with an exemplary embodiment will be described in detail.

The images obtained from the first medical apparatus or the second medical apparatus may be 2D cross-sectional images, or may be 3D volume images generated from the 2D cross-sectional images. For example, the ultrasonic imaging apparatus may obtain the 2D cross-sectional images, or may obtain 3D images by use of a hand sweep or a wobbling of an ultrasonic probe or by use of a probe provided with a 2D array method.

The CT imaging apparatus or the MR imaging apparatus, by changing the locations of orientations of cross sections, may obtain images of the plurality of cross sections, and as the cross sectional images are accumulated, the 3D volume image with respect to a certain portion of a body of a patient may be obtained. The method of generating the 3D volume image by accumulating the cross sectional images as such is referred to as a Multi-Planar Reconstruction (MPR). The second medical image, as to improve the contrast of an organ of interest of the patient, may be an image having an improved contrast. Hereinafter, for the convenience of providing descriptions, the first medical image is assumed to be the 2D image and the second medical image is assumed to be the 3D image.

The detection apparatus 130 may detect the reference position of an object that may be used as a reference point of registration when the first medical image and the second medical image are registered. The detection apparatus may detect the reference position by detecting at least a certain one of a position of the probe and a direction of the probe, and the movement of the probe may be detected. For example, in a case of scanning an abdomen of the object, the position at which the abdomen may be scanned, a solar plexus, for example, may be set as the reference position of the object. The reference position as such may be utilized as the reference position of registration when the first medical image and the second medical image are registered. The detection apparatus 130, for example, may include a sensor 132 configured to detect the changes of magnetic fields of a magnetic field generating apparatus 131. The magnetic field generating apparatus 131 may be fixed at a certain position of the first medical apparatus, and the sensor 132 may be disposed at a probe. The detection apparatus 130 may detect at least one of the position of the probe and the direction of the probe from the relative positional relationship of the sensor 132 and the magnetic field generating apparatus 131. Alternatively or additionally, the detection apparatus 130 may include an optical sensor, an accelerometer sensor, and an inclination sensor configured to detect at least one of the position of the probe and the direction of the probe. The detection apparatus 130 may calculate the at least one of the position of the probe and the direction of the probe as the reference information of the coordinate system of the detection apparatus 130. The reference information with respect to the reference position of the probe detected as such is transmitted to the medical image processing apparatus, and may be used as the reference point provided as to register images.

Figure 2:
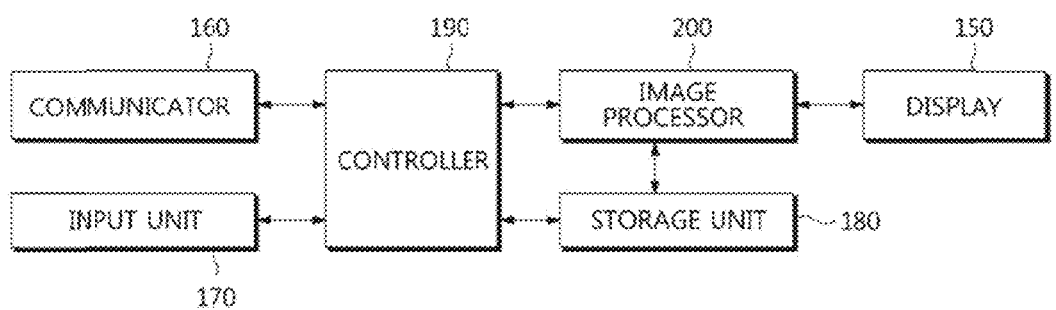
FIG. 2 is a block diagram showing a structure of a medical image processing apparatus in accordance with an exemplary embodiment.

The first medical apparatus and the second apparatus are configured to generate the first medical image and the second medical image, respectively, as to provide the first medical image and the second medical image to the medical image processing apparatus. FIG. 2 is a block diagram showing a structure of the medical image processing apparatus in accordance with an exemplary embodiment.

As illustrated in FIG. 2, the medical image processing apparatus may include a communicator 160, an input unit 170, a storage unit 180, a controller 190, and an image processor 200. However, not all the illustrated structuring elements are the structural elements that are needed, and other than the illustrated structuring elements, other general-purpose structuring elements may be further included.

The communicator is configured to receive the first medical image and the second medical image from the first medical apparatus and the second medical apparatus, respectively, and may receive from the detection apparatus 130 at least certain one of the position of the probe and the direction of the probe. The communicator may store the obtained second medical image at the storage unit. The communicator may data-communicate with respect to other apparatuses according to wire/wireless communication protocol, while the data communication may be preferably taken place according to the standards of Digital Imaging and Communications in Medicine (DICOM).

The storage unit may store the calculated data while performing an image processing according to the input data, in an exemplary embodiment. The storage unit may store the first medical image and the second medical image that are received at the communicator, and the 2D cross-sectional image and the 3D image that are generated by use of the second medical apparatus with respect to the object. In addition, the information on the reference position of the probe positioned at the object may be stored in the form of coordinate values, and anatomical information of anatomical entities provided for segmentation, position information, and the brightness information may be stored. The storage unit may include one of a non-volatile memory device such as a Read Only Memory (ROM), a Programmable Read Only Memory (PROM), an Erasable Programmable Read Only Memory (EPROM), or a flash memory, in the form of a volatile device terminal such as a Random Access Memory (RAM), or a storage device such as a hard disk or an optical disk.

The input unit may include a button, a keypad, a switch, a dial, or a touch interface provided as to receive an input to manipulate the medical image processing apparatus. The input unit may include a display panel configured to display images, and may be implemented in the form of a touch screen.

The controller is configured to control overall movements of the medical image processing apparatus. For example, the controller may control the image processor to generate and register images by use of a use command input through the input unit, data received through the communicator, and a program stored at the storage unit. In addition, the controller may control the image processed at the image processor to be shown at the display 150.

When the reference position of the probe is detected at the detection apparatus, the image processor may extract the corresponding position of the second medical image that corresponds to the reference position of the probe. The corresponding position is referred to as the reference position being shown at the first medical image, that is, the position at the second medical image corresponding to the reference point. The image processor may register the first medical image and the second medical image by use of the reference point of the first medical image and the reference point of the second medical image corresponding to the reference point of the first medical image.

The medical image processing apparatus may determine if a portion corresponding to a reference point of the first medical image is present at the second medical image, and if the reference point is present, to register the first medical image and the second medical image by using the reference points. The image processor first may determine the second medical image to be registered with respect to the first medical image. In other words, the image processor may determine the cross-sectional image from the second medical image to be registered with respect to the first medical image. As described above, the second medical image obtained from the second medical apparatus may be the 2D cross-sectional image, or may be the 3D image generated as the 2D cross-sectional images are accumulated and generated. Thus, the image processor may extract a predetermined cross-sectional image from the pre-imaged 2D cross-sectional images, or may extract a predetermined cross-sectional image from the 3D image.

Further in detail, the image processor may obtain the predetermined cross-sectional image from the second medical image by use of the coordinate information with respect to the reference position of the probe detected by use of the detection apparatus 130. In other words, from the data of the 2D cross-sectional images that are imaged by use of the second medical apparatus, the image processor may extract the cross-sectional image having the coordinate information with respect to the reference position of the probe.

When the cross-sectional image is extracted from the second medical image, the image processor may perform a segmentation on the anatomical entities that are shown on the extracted cross-sectional image. The segmentation, as one type of image processing, is referred to as a separating of each of the anatomical entities from a background image. An image processor, by performing the segmentation by use of a graph-cut method or the Gaussian Mixture Model (GMM) method, may obtain the information capable of extracting a reference point.

The image processor, by use of the segmentation information, may extract the reference point, which corresponds to the reference point of the first medical image, from the second medical image. The image processor, by use of the reference point of the first medical image and the reference point of the second medical image, may register the first medical image and the second medical image.

When a reference point corresponding to the reference point of the first medical image is present, the first medical image and the second medical image may be registered by use of the reference point of each of the first medical image and the second medical image. However, when the position corresponding to the reference point of the first medical image is not shown on the second medical image, the registration by use of the reference points cannot be performed.

Figure 3A:
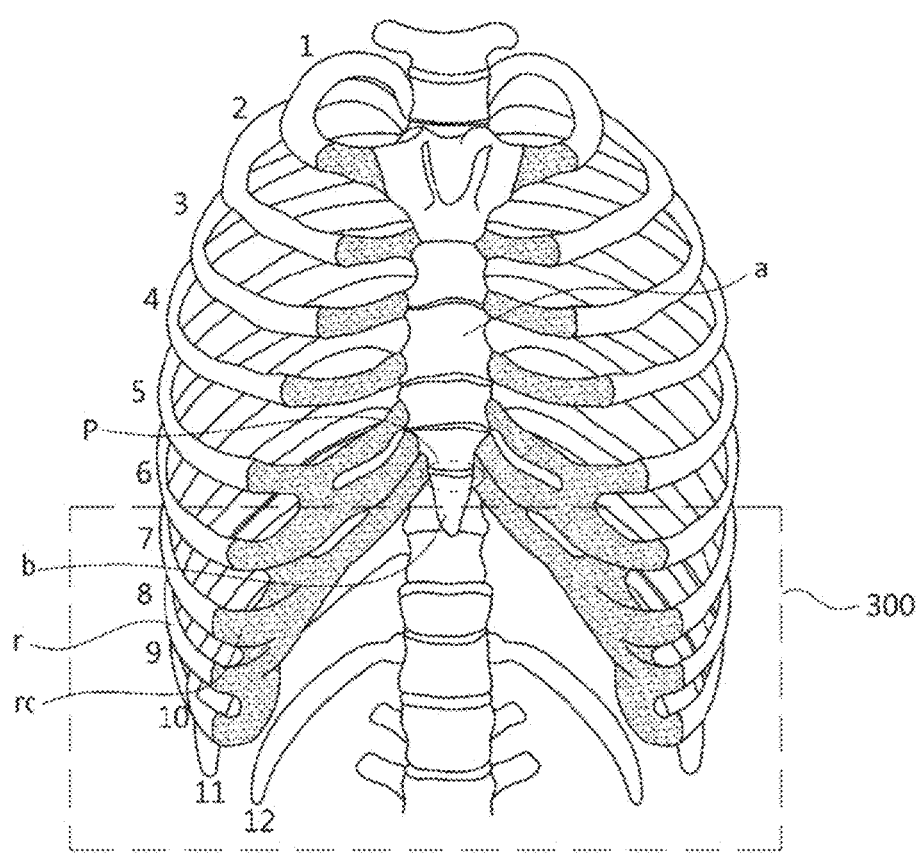
FIGS. 3A, 3B, and 3C show an estimating of a virtual reference point by use of the anatomical structure on a second medical image at which a reference point is not present.
Figure 3B:
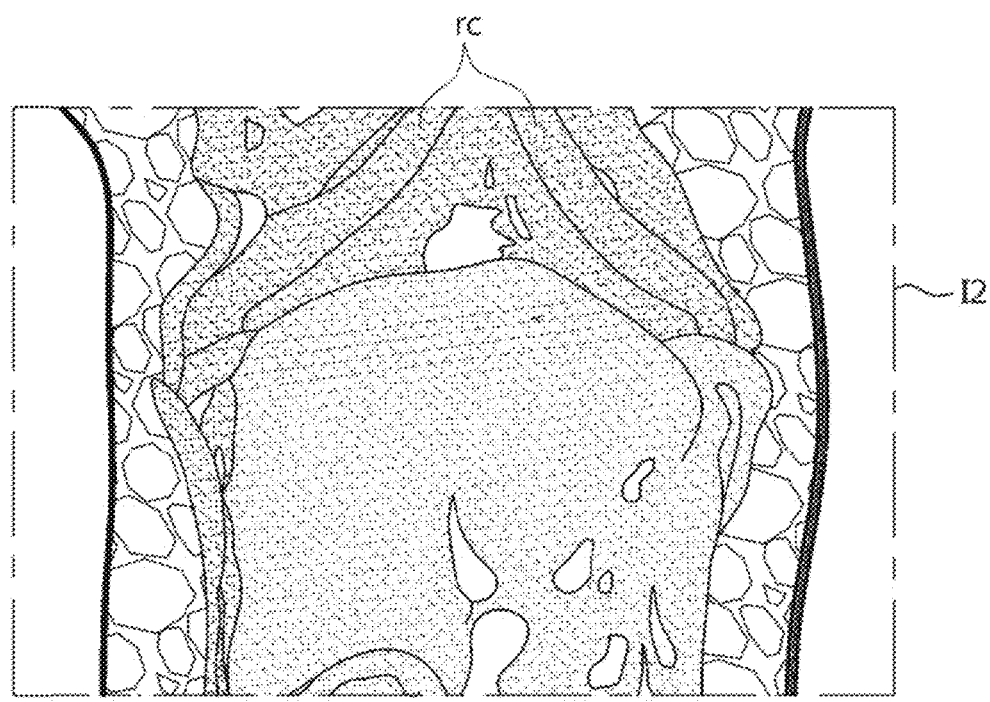
Figure 3C:
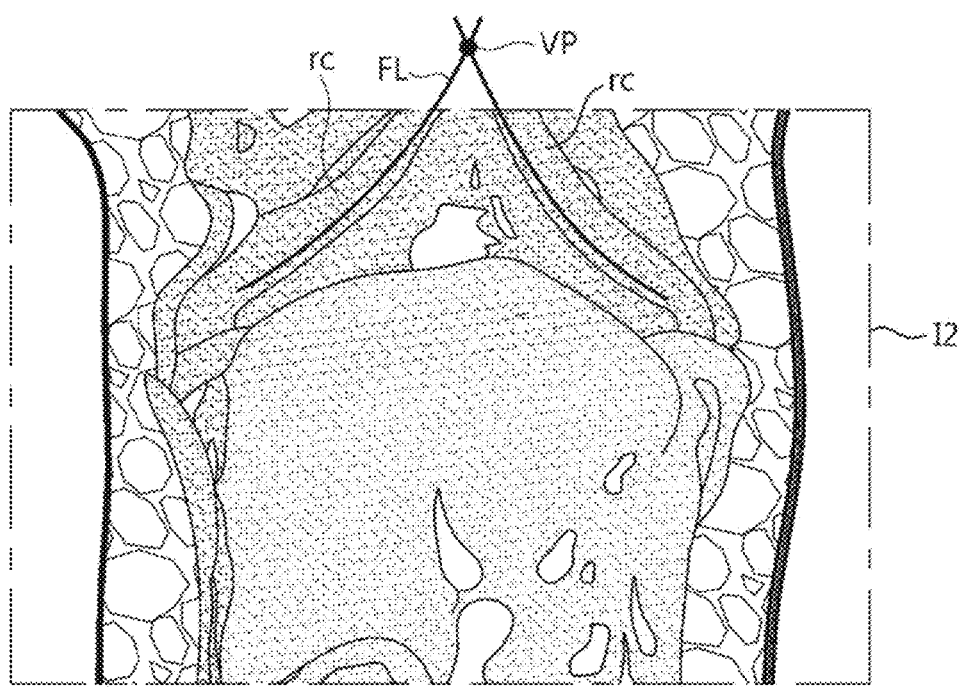

FIGS. 3A to 3C are drawings showing an estimating of a virtual reference point by use of the anatomical structure on the second medical image at which the reference point is not present. In an exemplary embodiment, the reference point P of the first medical image provided as to register the first medical image and the second medical image may be a solar plexus. In FIG. 3A, the structure of a bone of an area of the object, which is a CT image of an abdomen, that is, the second medical image, is illustrated, and on the imaged area 300, the solar plexus corresponding to the reference point of the first medical image is not included. An actual coronal view 12 of the imaged area 300 of the abdomen CT image shown in FIG. 3B, further illustrates that the solar plexus is not present. In an exemplary embodiment, in a case when the reference point is not shown on the at least one of the medical images that are subject to the registration, methods of estimating the virtual reference point by use of the anatomical structure of the surroundings of the reference point and registering the first medical image and the second medical image by use of the reference point of the first medical image and the virtual reference point of the second medical image are provided. Hereinafter, the method of estimating the virtual reference point from the medical image at which the reference point is not shown will be described in detail.

In FIG. 3A, the solar plexus that may be defined as connecting point of a sternal body (a) and an ensiform cartilage (b) may be referred to as a crossing point of left and right ribs (r) of No. 7, No. 8 and No. 9 ribs connected to the sternal body (a) and costal cartilages (rc). Although the solar plexus is not shown in FIG. 3B, the position of the solar plexus may be estimated by use of the left and right ribs and the costal cartilage.

First, the image processing apparatus may determine the surrounding tissue to estimate the reference point on the medical image at which no reference point is present, and may estimate the virtual reference point, which corresponds to the reference point, from the surrounding tissue based on the anatomical structure between the determined surrounding tissue and the reference point. With reference to FIGS. 3A and 3B, to estimate the reference point of the first medical image, that is, the solar plexus on the second medical image at which a solar plexus is not shown, the image processor may use the left and right ribs of No. 7, No. 8 and No. 9 and the anatomical structure between the ribs corresponding to the solar plexus and the solar plexus. The image processor may first extract the ribs and the costal cartilages from the second medical image, and then fit proper curved lines at the extracted ribs and the costal cartilages. The curved lines that are fit to the left and right ribs and to the costal cartilages may be pre-determined through a number of training images. For example, the image processor is configured to fit the proper curved lines at the ribs and the costal cartilages by use of a cubic spline or secondary curved lines. In FIG. 3C, the fit curved lines FL at the left and right ribs and at the costal cartilages are illustrated. As the curved lines are fit at the left and right ribs and the costal cartilages, a point at which the extended lines of the curved lines cross each other is determined as a crossing point, and the crossing point is estimated as the position at which the solar plexus would be present, that is, the virtual reference point VP. When the virtual reference point is estimated on the second medical image, the image processor may register the first medical image and the second medical image by use of the reference point of the first medical image and the estimated virtual reference point of the second medical image.

Figure 4A:
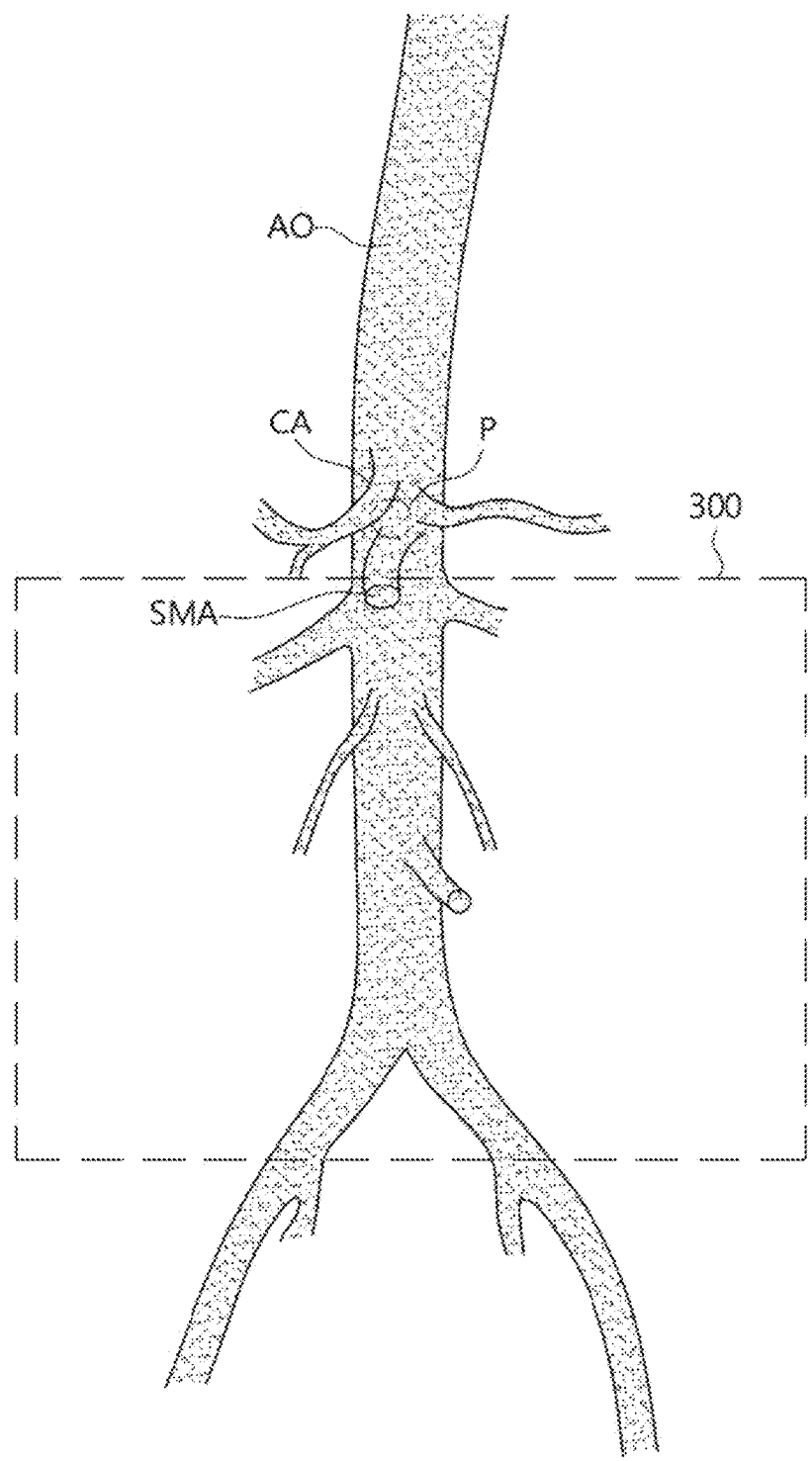
FIGS. 4A, 4B, and 4C are show an estimating of a virtual reference point by use of the anatomical structure on another second medical image at which a reference point is not present.
Figure 4B:
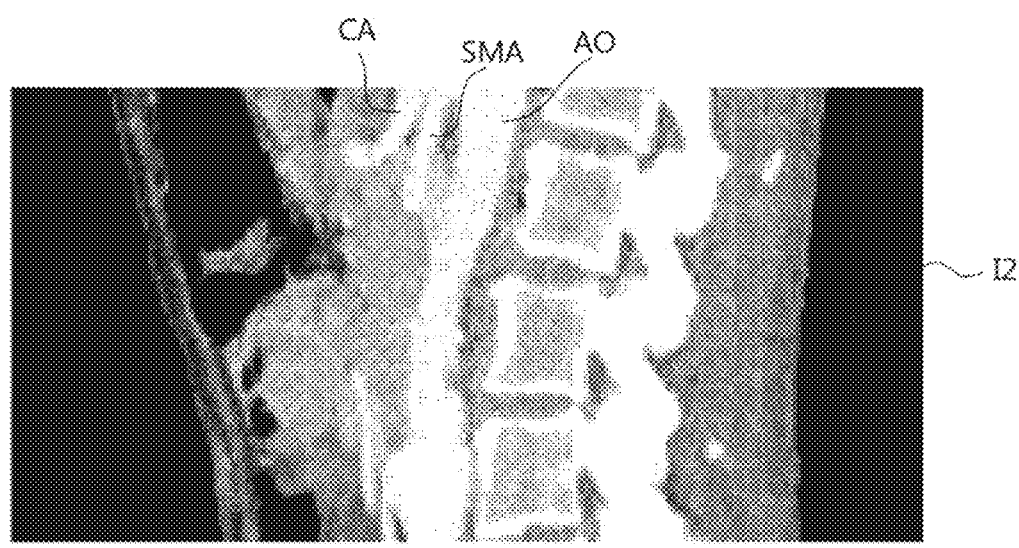
Figure 4C:
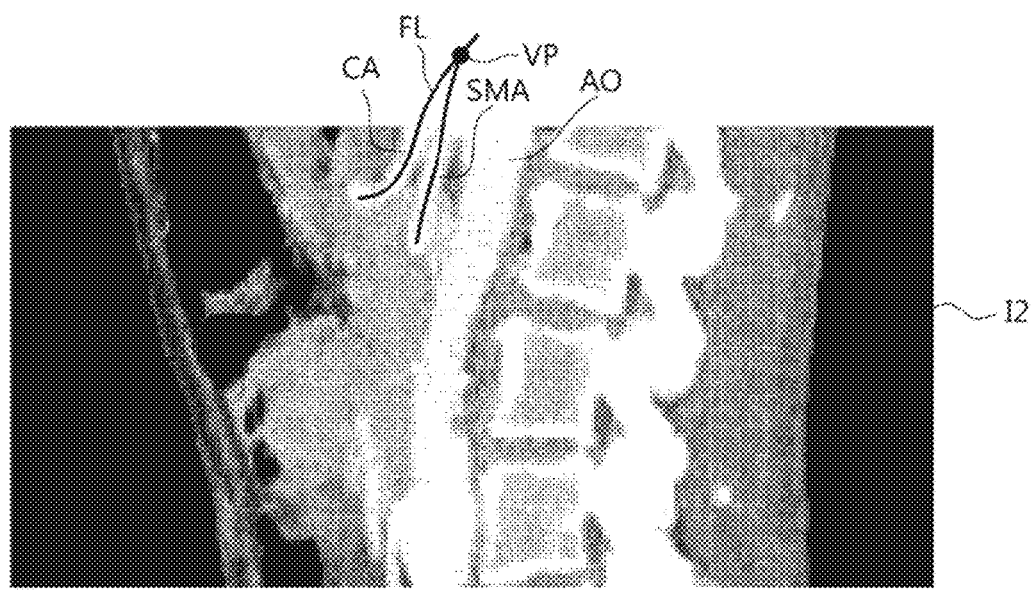

FIGS. 4A to 4C are drawings showing an estimating of a virtual reference point by use of the anatomical structure on a second medical image at which a reference point is not present. In the present exemplary embodiment, the reference point of the first medical image to register the first medical image and the second medical image may be a branch point P at which a superior mesenteric artery (SMA) and a celiac artery (CA) are branched from an aorta (AO). In FIG. 4A, the structure a blood vessel of the area of an object from which an abdomen CT image, that is, the second medical image, is imaged is illustrated as a coronal view, while the branch point of the superior mesenteric artery and the celiac artery, that is, the reference point of the first medical image, is not included in the imaged area 300 illustrated in FIG. 4A. An actual sagittal view of the imaged area 300 of the abdomen CT image of FIG. 4B further illustrates that the branch point is not imaged.

Although the branch point of the superior mesenteric artery and the celiac artery, that is, the reference point of the first medical image, is not shown in FIG. 4B, the position of the branch point may be estimated by use of the superior mesenteric artery and the celiac artery shown in FIG. 4B.

First, the image processing apparatus may determine the surrounding tissue to estimate the reference point on the medical image at which no reference point is present, and may estimate the virtual reference point, which corresponds to the reference point, from the surrounding tissue based on the anatomical structure between the determined surrounding tissue and the reference point. With reference to FIGS. 4A and 4C, to estimate the reference point of the second medical image at which the reference point of the first medical image, that is, the branch point of the superior mesenteric artery and the celiac artery, is not shown, the image processor may use the anatomical structure with respect to the aorta, the superior mesenteric artery and the celiac artery. The image processor may first extract the superior mesenteric artery and the celiac artery from the second medical image, and then fit proper curved lines at the superior mesenteric artery and the celiac artery. The curved lines that are fit at the superior mesenteric artery and the celiac artery may be pre-determined through a number of training images. For example, the image processor is configured to fit the proper curved lines at the superior mesenteric artery and the celiac artery by use of a cubic spline or secondary curved lines. In FIG. 4C, the fit curved lines FL at the superior mesenteric artery and the celiac artery are illustrated. As the curved lines are fit at the superior mesenteric artery and the celiac artery, a point at which the extended lines of the curved lines cross each other is determined as a crossing point, and the crossing point is estimated as the position at which the branch point of the superior mesenteric artery and the celiac artery would be present, that is, the virtual reference point VP. When the virtual reference point is estimated on the second medical image, the image processor may register the first medical image and the second medical image by use of the reference point of the first medical image and the estimated virtual reference point of the second medical image. In an exemplary embodiment, as illustrated from FIG. 3A to FIG. 4C, the reference point and the anatomical structure of the tissue structure related to the reference point are used to estimate a reference point that is not shown on the second medical image.

In another exemplary embodiment, geometric information such as a distance or direction between the pre-learned reference point and the surrounding tissue of the pre-learned reference point may be used to estimate a reference point that is not shown on the second medical image. This will be described in detail by referring to FIG. 5A to FIG. 6B.

Figure 5A:
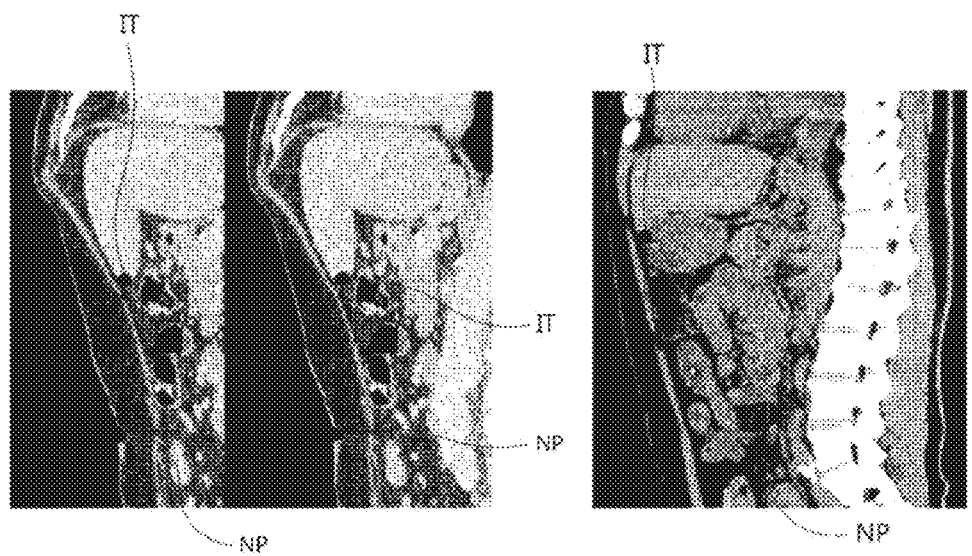
FIGS. 5A and 5B show an estimating of a virtual reference point by use of the geometric information between a navel and a liver on a medical image at which the navel, that is, a reference point, is not shown.
Figure 5B:
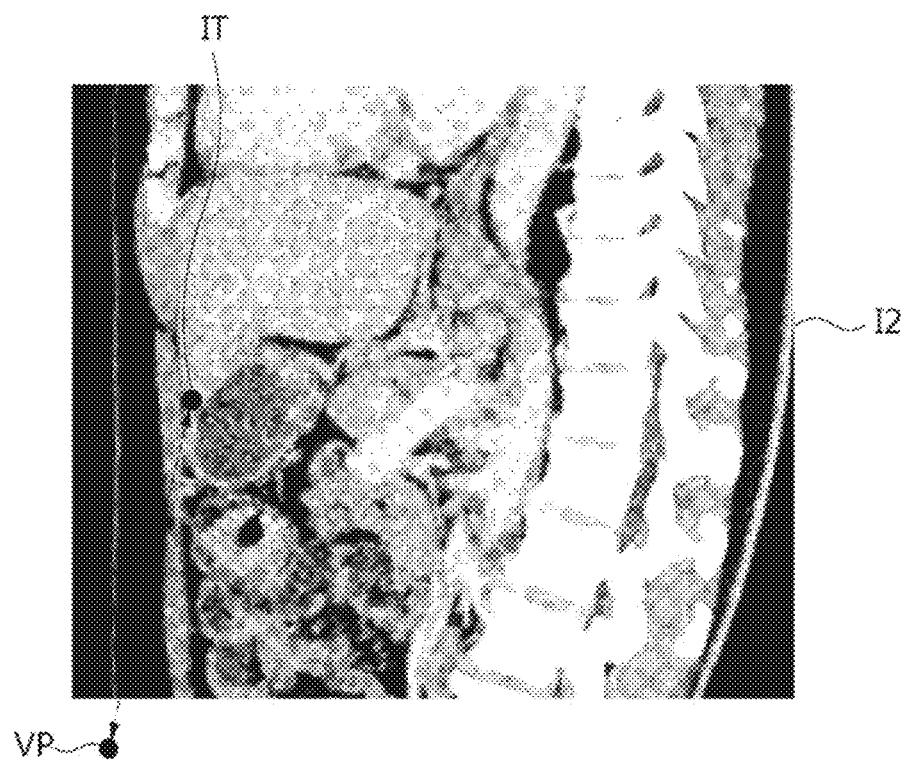
Figure 6A:
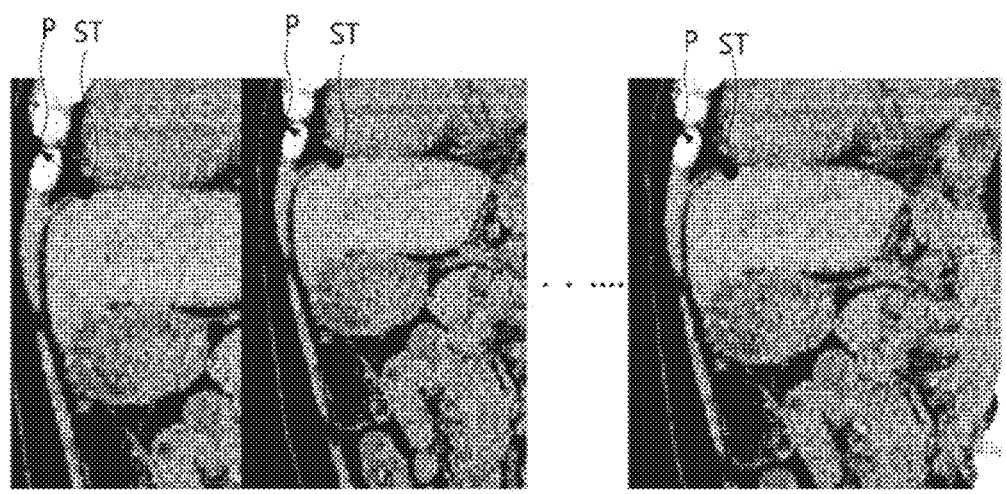
FIGS. 6A and 6B show an estimating of a virtual reference point by use of the geometric information between a solar plexus and a liver on a medical image at which the solar plexus, that is, a reference point, is not shown.
Figure 6B:

FIGS. 5A and 5B are drawings showing an estimating of a virtual reference point by use of the geometric information between a navel and a liver on a medical image at which the navel, that is, a reference point, is not shown, and FIGS. 6A and 6B are drawings showing an estimating of a virtual reference point by use of the geometric information between a solar plexus and a liver on a medical image at which the solar plexus, that is, a reference point, is not shown.

In FIG. 5A, CT images of the sagittal view at which the liver and the navel are shown are illustrated. The medical image processing apparatus may pre-learn the relative distance and direction between the position corresponding to the navel NP and the inferior tip IT of the liver, and store the learned information as such at the storage unit.

The navel corresponding to the reference point is not shown on the plurality of CT images of the sagittal view, that is, the second medical image, illustrated in FIG. 5B. To estimate the position of the navel by use of the pre-learned geometric relationship between the inferior tip of the liver and the navel, the image processor may extract the inferior tip of the liver from the second medical image, estimate the relative position of the navel with respect to the extracted inferior tip of the liver, by use of the pre-learned and stored information on the relative distance and the direction between the navel with respect to the inferior tip of the liver, and determine the estimated position as the virtual reference point VP.

In FIG. 6A, CT images of the sagittal view at which the liver and the solar plexus are shown are illustrated. The medical image processing apparatus may pre-learn the relative distance and direction between the position corresponding to the solar plexus and the superior tip ST of the liver, and store the learned information in the storage unit.

The solar plexus corresponding to the reference point is not shown on the plurality of CT images of the sagittal view, that is, the second medical image, illustrated in FIG. 6B. To estimate the position of the solar plexus by use of the pre-learned geometric relationship between the superior tip of the liver and the solar plexus, the image processor may extract the superior tip of the liver from the second medical image, estimate the relative position of the solar plexus with respect to the extracted superior tip of the liver, by use of the pre-learned and stored information on the relative distance and the direction between the solar plexus with respect to the superior tip of the liver, and determine the estimated position as the virtual reference point VP. As described by referring to FIGS. 5A through 6B, the medical image processing apparatus may estimate the virtual reference point from the medical image, at which a reference point is not shown, by use of the geometric relationship between the pre-learned reference point and the surrounding tissue of the pre-learned reference point. The image processor may register the first medical image and the second medical image by use of the reference point of the first medical image and the estimated virtual reference point of the second medical image.

Referring to FIGS. 3 through 6, in a case when a reference point is not shown on certain one of the medical images subject to registration, a method of estimating the virtual reference point is described, but in a case when the reference point is not shown on each of the first medical image and the second medical image, both of which are subject to registration, the virtual reference points may be estimated on each of the first medical image and the second medical image by use of the method described above, and the first medical image and the second medical image may be registered by use of the estimated virtual reference points.

When the cross-sectional images extracted from the first medical image and the second medical image are registered at the image processor by use of the method described above, the display may display the image registered at the image processor. The registered image displayed at the display may be a fusion image of the first medical image and the second medical image, or an image having the first medical image and the second medical image parallelly disposed from an identical point of observation.

Figure 7:
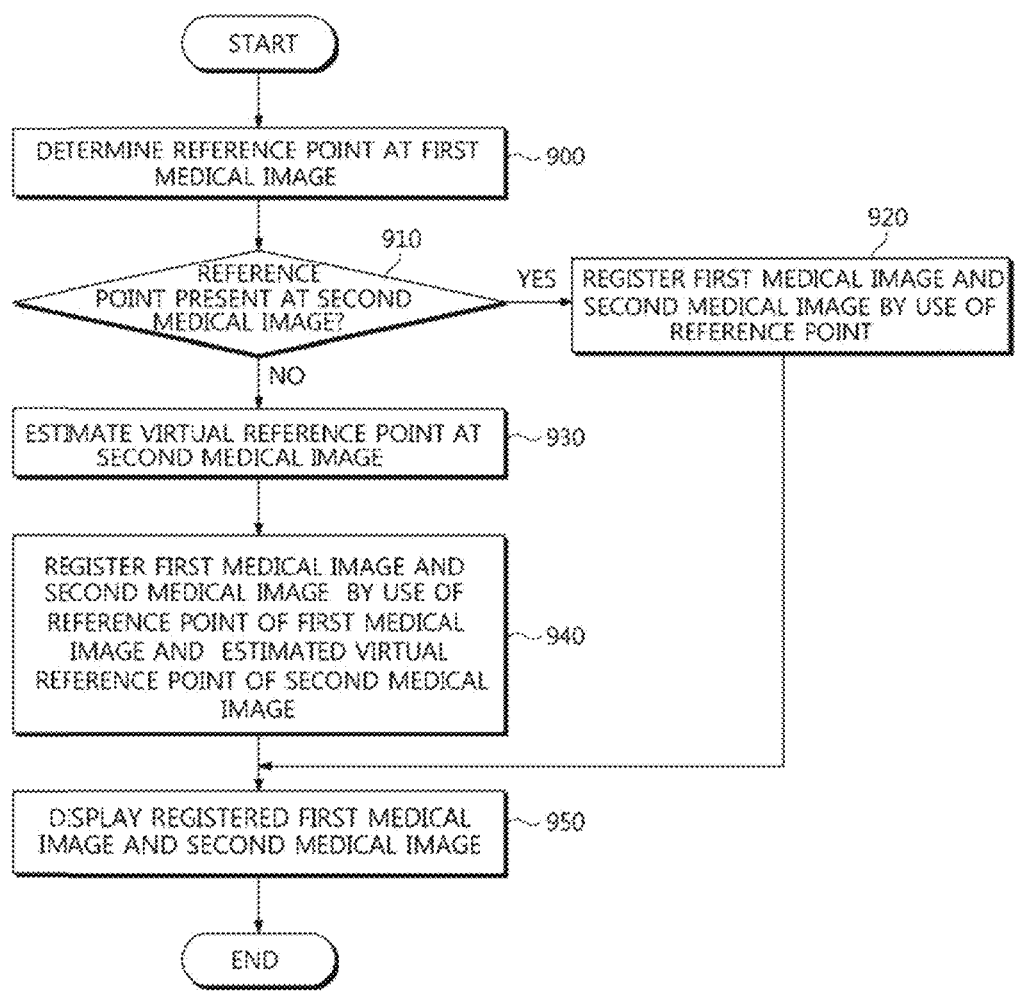
FIG. 7 is a flow chart showing a medical image registration method in accordance with an exemplary embodiment.

FIG. 7 is a flow chart showing a medical image registration method in accordance with an exemplary embodiment. Described above with reference to FIGS. 1-6 is applicable here and will not be repeated.

Referring to FIG. 7, the medical image processing apparatus may determine a reference point at the first medical image (operation 900), and determine if a reference point corresponding to the reference point of the first medical image is present at the second medical image (operation 910). If the reference point is present at the second medical image, the medical image processing apparatus may register the first medical image and the second medical image by use of the reference point (operation 920).

The reference point of the first medical image may be designated by a user, or the reference position of the ultrasonic probe detected at the detection apparatus may be determined as the reference point at the medical image processing apparatus, as described in detail above.

If a reference point is not present at the second medical image, the medical image processing apparatus may estimate a virtual reference point at the second medical image (operation 930), and may register the first medical image and the second medical image by use of the reference point of the first medical image and the virtual reference image of the second medical image (operation 940). Estimation of the virtual reference point is described in detail and is applicable here.

When the first medical image and the second medical image are registered, the display may display the first medical image and the second medical image (operation 950).

The foregoing exemplary embodiments and advantages are merely exemplary and are not to be construed as limiting. Also, the description of the exemplary embodiments is intended to be illustrative, and not to limit the scope of the claims, and many alternatives, modifications, and variations will be apparent to those skilled in the art.

What is claimed is:

1. A medical image registration method comprising:
    determining whether a reference point corresponding to a position of a given anatomical entity of an object is present in a first medical image and a second medical image of the object;
    in response to the determining that the reference point is not present, indicating that the given anatomical entity is not captured, in at least one among the first medical image and the second medical image, estimating a virtual reference point corresponding to the position of the given anatomical entity relative to the at least one among the first medical image and the second medical image, in which the reference point is not present, by using anatomical information of the object; and
    registering the first medical image and the second medical image by using the estimated virtual reference point.

2. The medical image registration method of claim 1, wherein the estimating the virtual reference point comprises:
    determining a peripheral tissue related to the reference point in the first medical image and the second medical image in response to the determining that the reference point is not present in each of the first medical image and the second medical image; and
    estimating the virtual reference point corresponding to the position of the given anatomical entity relative to each of the first medical image and the second medical image based on an anatomical structure between the determined peripheral tissue and the reference point.

3. The medical image registration method of claim 1, wherein the estimating the virtual reference point comprises:
    determining a peripheral tissue related to the reference point in the first medical image and the second medical image in response to the determining that the reference point is not present in each of the first medical image and the second medical image; and
    estimating the virtual reference point relative to each of the first medical image and the second medical image by using pre-learned shape information related to the peripheral tissue or by using geometric information between the peripheral tissue and the reference point.

4. The medical image registration method of claim 2, wherein the registering the first medical image and the second medical image comprises:
    registering the first medical image and the second medical image by using estimated virtual reference points relative to the first medical image and the second medical image.

5. The medical image registration method of claim 1, wherein the estimating the virtual reference point comprises:
    in response to the determining that the reference point is present only in the first medical image, determining a peripheral tissue related to the reference point in the second medical image in which the reference point is not present; and
    estimating the virtual reference point corresponding to the reference point based on an anatomical structure between the determined peripheral tissue and the reference point.

6. The medical image registration method of claim 1, wherein the estimating the virtual reference point comprises:
    in response to the determining that the reference point is present only in the first medical image, determining a peripheral tissue related to the reference point in the second medical image not having the reference point; and
    estimating the virtual reference point by using pre-learned shape information related to the determined peripheral tissue or by using geometric information between the peripheral tissue and the reference point.

7. The medical image registration method of claim 5, wherein the registering the first medical image and the second medical image comprises:
    registering the first medical image and the second medical image by using the reference point of the first medical image and the estimated virtual reference point of the second medical image.

8. A medical image processing apparatus comprising:
    a processor which controls a communication interface to receive a first medical image and a second medical image of an object from a first medical imaging apparatus and a second medical imaging apparatus, respectively; and
    an image processor configured to estimate, by using anatomical information of the object, a virtual reference point corresponding to a reference point the reference point corresponding to a position of a given anatomical entity of the object, relative to at least one among the first medical image and the second medical image in which the reference point is not shown, indicating that the given anatomical entity is not captured.

9. The medical image processing apparatus of claim 8, wherein:
    the image processor is configured to estimate the virtual reference point corresponding to the reference point in the second medical image by using the anatomical information of the object, when the reference point is present only in the first medical image, and register the first medical image and the second medical image by using the reference point of the first medical image and the virtual reference point of the second medical image.

10. The medical image processing apparatus of claim 9, wherein:
    the image processor is configured to determine a peripheral tissue related to the the second medical image, and estimate the virtual reference point corresponding to the reference point based on an anatomical relationship between the peripheral tissue and the reference point.

11. The medical image processing apparatus of claim 10, wherein:
    the image processor is configured to determine a geometric structure between the peripheral tissue and the reference point based the anatomical relationship between the peripheral tissue and the reference point, and estimate the virtual reference point corresponding to the reference point by using the geometric structure.

12. The medical image processing apparatus of claim 10, wherein:
the image processor is configured to estimate the virtual reference point corresponding to the reference point by using pre-learned shape information with respect to the peripheral tissue or by using geometric information between the peripheral tissue and the reference point.

13. The medical image processing apparatus of claim 8, wherein:
the image processor is configured to estimate virtual reference points corresponding to the reference point relative to the first medical image and the second medical image by using the anatomical information of the object when the reference point is not present in each of the first medical image and the second medical image, and register the first medical image and the second medical image by using the estimated virtual reference points.

14. The medical image processing apparatus of claim 13, wherein:
the image processor is configured to determine a peripheral tissue related to the reference reference point from the first medical image and the second medical image, and estimate the virtual reference points relative to the first medical image and the second medical image corresponding to the reference point based on an anatomical relationship between the peripheral tissue and the reference point.

15. The medical image processing apparatus of claim 14, wherein:
the image processor is configured to determine a geometric structure between the peripheral tissue and the reference point based on the anatomical relationship between the peripheral tissue and the reference point, and estimate the virtual reference points relative to the first medical image and the second medical image corresponding to the reference point by using the geometric structure.

16. The medical image processing apparatus of claim 14, wherein:
the image processor is configured to estimate the virtual reference points relative to the first medical image and the second medical image corresponding to the reference point by using pre-learned shape information with respect to the peripheral tissue or by using geometric information between the peripheral tissue and the reference point.

17. A medical image registration method comprising:
determining a reference point corresponding to a position of a given anatomical entity of an object in a first medical image;
estimating, by using anatomical information of the object, a virtual reference point at a position corresponding to the position of the given anatomical entity relative to a second medical image in which the reference point is not present, indicating that the given anatomical entity is not captured; and
registering the first medical image and the second medical image by using the reference point in the first medical image and the estimated virtual reference point relative to the second medical image.

18. The medical image registration method of claim 17, wherein the estimating the virtual reference point comprises:
determining a peripheral tissue related to the reference point; and
estimating the virtual reference point corresponding to the reference point based on an anatomical relationship between the peripheral tissue and the reference point.

19. The medical image registration method of claim 18, wherein the estimating the virtual reference point comprises:
determining a geometric structure between the peripheral tissue and the reference point based on the anatomical relationship between the peripheral tissue and the reference point; and
estimating the virtual reference point corresponding to the reference point by using the geometric structure.

20. The medical image registration method of claim 18, wherein the estimating the virtual reference point comprises:
estimating the virtual reference point by using pre-learned shape information with respect to the peripheral tissue or by using geometric information between the peripheral tissue and the reference point.

21. The medical image registration method of claim 1, wherein the first medical image and the second medical image are images of the object captured by different imaging modalities, and
the medical image registration method further comprises:
in response to the determining that the reference point is present in the first medical image and not present in the second medical image, approximating a position of the reference point relative to the second medical image as the virtual reference point, and registering the first medical image and the second medical image based on the reference point present in the first medical image and the virtual reference point which has been approximated relative to the second medical image; and
when it is determined that the reference point is present in the first medical image and the second medical image, registering the first medical image and the second medical image by using the reference point present in the first medical image and the reference point present in the second medical image.

* * * * *